United States Patent
Geng et al.

(10) Patent No.: US 9,603,107 B2
(45) Date of Patent: *Mar. 21, 2017

(54) METHOD AND APPARATUS FOR CONTROLLING TRANSMIT POWER OF USER EQUIPMENT

(71) Applicant: Huawei Technologies Co., Ltd., Shenzhen (CN)

(72) Inventors: Tingting Geng, Shanghai (CN); Xiaoxiao Zheng, Shanghai (CN); Xueli Ma, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,144

(22) Filed: Oct. 3, 2016

(65) Prior Publication Data

US 2017/0026918 A1    Jan. 26, 2017

Related U.S. Application Data

(63) Continuation of application No. 14/881,020, filed on Oct. 12, 2015, now Pat. No. 9,474,032, which is a
(Continued)

(51) Int. Cl.
*H04B 7/00* (2006.01)
*H04W 52/32* (2009.01)
(Continued)

(52) U.S. Cl.
CPC ........ *H04W 52/325* (2013.01); *H04L 5/0055* (2013.01); *H04L 5/0057* (2013.01);
(Continued)

(58) Field of Classification Search
USPC ....................................................... 455/522
See application file for complete search history.

(56) References Cited

U.S. PATENT DOCUMENTS

| 2006/0120332 A1 | 6/2006 | Ali-Hackl et al. |
| 2010/0087202 A1* | 4/2010 | Ventola ............... H04W 52/146 455/452.1 |
| 2010/0273520 A1* | 10/2010 | Pelletier ................ H04L 5/0007 455/522 |

FOREIGN PATENT DOCUMENTS

| CN | 102300305 A | 12/2011 |
| CN | 102752836 A | 10/2012 |

(Continued)

OTHER PUBLICATIONS

"3rd Generation Partnership Project; Technical Specification Group Radio Access Network; Physical Layer Procedures (FDD) (Release 11),"3GPP TS 25.214, v11.5.0, Feb. 2013, 128 pages.
(Continued)

*Primary Examiner* — Ankur Jain
(74) *Attorney, Agent, or Firm* — Slater Matsil, LLP

(57) ABSTRACT

The present invention provides a method and an apparatus for controlling transmit power of a user equipment, the method includes reducing a gain factor of a first-type channel of the UE when total uplink transmit power of the UE exceeds maximum allowed transmit power. The method further includes determining total uplink transmit power of the UE and if the total uplink transmit power of the UE exceeds the maximum allowed transmit power and the gain factor of the first-type channel is reduced to a preset gain factor threshold, reducing a gain factor of a second-type channel of the UE so that total uplink transmit power of the UE does not exceed the maximum allowed transmit power.

20 Claims, 5 Drawing Sheets

---

101 — A user equipment UE reduces a gain factor of its first-type channel when total uplink transmit power of the user equipment exceeds maximum allowed transmit power 102 — The UE determines its total uplink transmit power, and if the total uplink transmit power of the UE exceeds the maximum allowed transmit power and the gain factor of the first-type channel is reduced to a preset gain factor threshold, the UE reduces a gain factor of its second-type channel, so that total uplink transmit power of the UE does not exceed the maximum allowed transmit power

Related U.S. Application Data continuation of application No. PCT/CN2013/074166, filed on Apr. 12, 2013.

(51) Int. Cl.
*H04W 52/14* (2009.01)
*H04L 5/00* (2006.01)
*H04W 52/52* (2009.01)
*H04W 52/34* (2009.01)
*H04W 52/36* (2009.01)

(52) U.S. Cl.
CPC ......... *H04W 52/146* (2013.01); *H04W 52/52* (2013.01); *H04W 52/346* (2013.01); *H04W 52/36* (2013.01)

(56) References Cited

FOREIGN PATENT DOCUMENTS

| | | | |
|---|---|---|---|
| EP | 1564905 | A2 | 8/2005 |
| RU | 2344545 | C2 | 1/2009 |
| WO | 2006103067 | A1 | 10/2006 |

OTHER PUBLICATIONS

"CQI and ACK/NACK Transmission Supporting Dual-Cell HSDPA," Agenda Item: 7, Source: Samsung, Document for: Discussion and Decision, 3GPP TSG RAN WG1 Meeting #54bis, R1-083562, Prague, Czech Republic, Sep. 29-Oct. 3, 2008, 4 pages.

\* cited by examiner

METHOD AND APPARATUS FOR CONTROLLING TRANSMIT POWER OF USER EQUIPMENT

CROSS-REFERENCE TO RELATED APPLICATIONS

This application is a continuation of U.S. application Ser. No. 14/881,020, filed on Oct. 12, 2015, which is a continuation of International Application No. PCT/CN2013/074166, filed on Apr. 12, 2013, all of the afore-mentioned patent applications are hereby incorporated by reference in their entireties.

TECHNICAL FIELD

The present invention relates to the field of communications and in particular, to a method and an apparatus for controlling transmit power of a user equipment.

BACKGROUND

In a wideband code division multiple access (WCDMA) system, a user equipment (UE) may be configured with one or more transmission technologies. For example, an R99 transmission technology, a high speed downlink packet access (HSDPA) transmission technology and a high speed uplink packet access (HSUPA) transmission technology. Uplink transport channels, that is, dedicated physical channels, of the R99 transmission technology mainly include a dedicated physical data channel (DPDCH) and a dedicated physical control channel (DPCCH); uplink transport channels of the HSDPA transmission technology mainly include a high speed dedicated physical control channel (HS-DPCCH); uplink enhanced dedicated transmission channels, that is, enhanced dedicated channels (E-DCHs), of the HSUPA transmission technology mainly include an E-DCH dedicated physical data channel (E-DPDCH) and an E-DCH dedicated physical control channel (E-DPCCH); a UE sends data to a network by using a configured transmission technology, so as to implement communication of the UE with the network; when transmit power for the UE to send the data to the network is relatively high, not only quality that the UE sends the data is affected, but also interference is caused to another user equipment and therefore, the transmit power of the UE needs to be controlled.

At present, a method for controlling transmit power of a UE is provided, which is specifically: determining transmit power of a DPDCH, an E-DPCCH, an E-DPDCH and an HS-DPCCH according to transmit power of a DPCCH and calculating total uplink transmit power of the UE according to transmit power that is of the DPDCH, the E-DPCCH, the E-DPDCH and the HS-DPCCH channel and that is relative to the DPCCH; when the total uplink transmit power of the UE exceeds maximum allowed transmit power, determining whether the UE is configured with an E-DCH channel of HSUPA, where the maximum allowed transmit power is a smaller power value of maximum output power corresponding to a power class of the UE and uplink power configured by a network for the UE by using signaling; if the UE is not configured with the E-DCH channel, reducing transmit power of the DPCCH, the DPDCH and the HS-DPCCH that are of the UE by an equal scaling factor; and if the UE is configured with the E-DCH channel, first reducing a gain factor of the E-DPDCH of the E-DCH, determining total uplink transmit power of the UE and determining whether the total uplink transmit power of the UE exceeds the maximum allowed transmit power and if the total uplink transmit power of the UE exceeds the maximum allowed transmit power, reducing a gain factor of the DPCCH of the UE and reducing gain factors of the DPDCH, the E-DPCCH and the HS-DPCCH that are of the UE by an equal scaling factor, so that total uplink transmit power of the UE does not exceed the maximum allowed transmit power.

It should be noted that a gain factor of a channel is a ratio of transmit power of the channel to transmit power of a DPCCH and when the transmit power of the DPCCH is constant, reducing the gain factor of the channel is equivalent to reducing the transmit power of the channel.

In a 3G network, circuit switch (CS) services are mainly responds for calls between user equipments, packet switch (PS) services are mainly responds for Internet access data of a user equipment, the DPCCH and DPDCH are configured to bear the CS services and the E-DPDCH, E-DPCCH and HS-DPCCH are configured to bear the PS services. When total uplink transmit power of a UE exceeds maximum allowed transmit power, in the prior art, transmit power of a DPCCH, a DPDCH, an E-DPDCH, an E-DPCCH and an HS-DPCCH is simultaneously reduced by an equal proportion, which may increase a frequency of CS service call drop, resulting in discontinuity of calls between user equipments.

SUMMARY

To reduce a frequency of CS service call drop, embodiments of the present invention provide a method and an apparatus for controlling transmit power of a user equipment.

According to a first aspect, a method for controlling transmit power of a user equipment is provided, where the method includes reducing a gain factor of a first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel; and determining total uplink transmit power of the UE and if the total uplink transmit power of the UE exceeds the maximum allowed transmit power and the gain factor of the first-type channel is reduced to a preset gain factor threshold, reducing a gain factor of a second-type channel of the UE, so that total uplink transmit power of the UE does not exceed the maximum allowed transmit power, where the second-type channel includes a dedicated physical channel, where the dedicated physical channel includes a dedicated physical control channel and a dedicated physical data channel.

With reference to the first aspect, in a first possible implementation manner of the foregoing first aspect, the first-type channel includes a high speed dedicated physical control channel (HS-DPCCH); and correspondingly, the reducing a gain factor of a first-type channel of the UE when total uplink transmit power of the user equipment (UE) exceeds maximum allowed transmit power includes: when the total uplink transmit power of the UE exceeds the maximum allowed transmit power, reducing a gain factor of the HS-DPCCH, so that total uplink transmit power of the UE does not exceed the maximum allowed transmit power, or reducing a gain factor of the HS-DPCCH to a first preset gain factor threshold.

With reference to the first aspect, in a second possible implementation manner of the foregoing first aspect, the first-type channel includes an enhanced dedicated physical data channel (E-DPDCH), an enhanced dedicated physical control channel (E-DPCCH) and a high speed dedicated physical control channel (HS-DPCCH); and correspondingly, the reducing a gain factor of a first-type channel of the UE when total uplink transmit power of the user equipment (UE) exceeds maximum allowed transmit power includes preferably reducing a gain factor of the E-DPDCH when the total uplink transmit power of the UE exceeds the maximum allowed transmit power; and determining total uplink transmit power of the UE and if the total uplink transmit power of the UE exceeds the maximum allowed transmit power and transmit power of the E-DPDCH is reduced to 0, reducing gain factors of the E-DPCCH and the HS-DPCCH.

With reference to the second possible implementation manner of the first aspect, in a third possible implementation manner of the foregoing first aspect, the reducing gain factors of the E-DPCCH and the HS-DPCCH includes: preferably reducing a gain factor of the E-DPCCH; and determining total uplink transmit power of the UE and if the total uplink transmit power of the UE exceeds the maximum allowed transmit power and the gain factor of the E-DPCCH is reduced to a second preset gain factor threshold, reducing a gain factor of the HS-DPCCH.

With reference to the second possible implementation manner of the first aspect, in a fourth possible implementation manner of the foregoing first aspect, the reducing gain factors of the E-DPCCH and the HS-DPCCH includes: preferably reducing a gain factor of the HS-DPCCH; and determining total uplink transmit power of the UE and if the total uplink transmit power of the UE exceeds the maximum allowed transmit power and the gain factor of the HS-DPCCH is reduced to a first preset gain factor threshold, reducing a gain factor of the E-DPCCH.

With reference to the third possible implementation manner of the first aspect or the fourth possible implementation manner of the first aspect, in a fifth possible implementation manner of the foregoing first aspect, the reducing a gain factor of the HS-DPCCH includes if a current timeslot of the UE is a timeslot used to transmit channel quality indicator CQI information of the HS-DPCCH, reducing the gain factor of the HS-DPCCH, so that total uplink transmit power of the UE does not exceed the maximum allowed transmit power, or reducing the gain factor of the HS-DPCCH to 0.

With reference to the third possible implementation manner of the first aspect or the fourth possible implementation manner of the first aspect, in a sixth possible implementation manner of the foregoing first aspect, the reducing a gain factor of the HS-DPCCH includes: if a current timeslot of the UE is a timeslot used to transmit positive acknowledgement/negative acknowledgement (ACK/NACK) information of the HS-DPCCH, reducing the gain factor of the HS-DPCCH, so that total uplink transmit power of the UE does not exceed the maximum allowed transmit power, or reducing the gain factor of the HS-DPCCH to a third preset gain factor threshold.

With reference to the first aspect, in a seventh possible implementation manner of the foregoing first aspect, the second-type channel includes a dedicated physical control channel (DPCCH) and a dedicated physical data channel (DPDCH); and correspondingly, the reducing a gain factor of a second-type channel of the UE, so that total uplink transmit power of the UE does not exceed the maximum allowed transmit power, includes: reducing a gain factor of the DPCCH and a gain factor of the DPDCH, so that total uplink transmit power of the UE does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

With reference to the seventh possible implementation manner of the first aspect, in an eighth possible implementation manner of the foregoing first aspect, in addition to the reducing a gain factor of the DPCCH and a gain factor of the DPDCH, the method further includes: reducing the gain factor of the first-type channel, where a ratio of a reduced gain factor of the first-type channel to the reduced gain factor of the DPCCH equals a ratio of the gain factor of the first-type channel before reduction to the gain factor of the DPCCH before reduction.

According to a second aspect, an apparatus for controlling transmit power of a user equipment is provided, where the apparatus includes: a first reduction module, configured to reduce a gain factor of a first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel; and a second reduction module, configured to determine total uplink transmit power of the UE and if the total uplink transmit power of the UE exceeds the maximum allowed transmit power and the gain factor of the first-type channel is reduced to a preset gain factor threshold, reduce a gain factor of a second-type channel of the UE, so that total uplink transmit power of the UE does not exceed the maximum allowed transmit power, where the second-type channel includes a dedicated physical channel, where the dedicated physical channel includes a dedicated physical control channel and a dedicated physical data channel.

With reference to the second aspect, in a first possible implementation manner of the foregoing second aspect, the first-type channel includes a high speed dedicated physical control channel (HS-DPCCH); and correspondingly, the first reduction module includes: a first reduction unit, configured to: when the total uplink transmit power of the UE exceeds the maximum allowed transmit power, reduce a gain factor of the HS-DPCCH, so that total uplink transmit power of the UE does not exceed the maximum allowed transmit power, or reduce a gain factor of the HS-DPCCH to a first preset gain factor threshold.

With reference to the second aspect, in a second possible implementation manner of the foregoing second aspect, the first-type channel includes an enhanced dedicated physical data channel (E-DPDCH), an enhanced dedicated physical control channel (E-DPCCH) and a high speed dedicated physical control channel (HS-DPCCH); and correspondingly, the first reduction module includes: a second reduction unit, configured to reduce a gain factor of the E-DPDCH when the total uplink transmit power of the UE exceeds the maximum allowed transmit power; and a third reduction unit, configured to determine total uplink transmit power of the UE and if the total uplink transmit power of the UE exceeds the maximum allowed transmit power and transmit power of the E-DPDCH is reduced to 0, reduce gain factors of the E-DPCCH and the HS-DPCCH.

With reference to the second possible implementation manner of the second aspect, in a third possible implementation manner of the second aspect, the third reduction unit includes: a first reduction subunit, configured to preferably reduce a gain factor of the E-DPCCH; and a second reduction subunit, configured to determine total uplink transmit power of the UE and if the total uplink transmit power of the UE exceeds the maximum allowed transmit power and the gain factor of the E-DPCCH is reduced to a second preset gain factor threshold, reduce a gain factor of the HS-DPCCH.

With reference to the second possible implementation manner of the second aspect, in a fourth possible implementation manner of the second aspect, the third reduction unit includes: a third reduction subunit, configured to reduce a gain factor of the HS-DPCCH; and a fourth reduction subunit, configured to determine total uplink transmit power of the UE and if the total uplink transmit power of the UE exceeds the maximum allowed transmit power and the gain factor of the HS-DPCCH is reduced to a first preset gain factor threshold, reduce a gain factor of the E-DPCCH.

With reference to the third possible implementation manner of the second aspect or the fourth possible implementation manner of the second aspect, in a fifth possible implementation manner of the foregoing second aspect, the third reduction unit includes: a fifth reduction subunit, configured to: if a current timeslot of the UE is a timeslot used to transmit channel quality indicator CQI information of the HS-DPCCH, reduce the gain factor of the HS-DPCCH, so that total uplink transmit power of the UE does not exceed the maximum allowed transmit power, or reduce the gain factor of the HS-DPCCH to 0.

With reference to the third possible implementation manner of the second aspect or the fourth possible implementation manner of the second aspect, in a sixth possible implementation manner of the foregoing second aspect, the third reduction unit includes: a sixth reduction subunit, configured to: if a current timeslot of the UE is a timeslot used to transmit positive acknowledgement/negative acknowledgement (ACK/NACK) information of the HS-DPCCH, reduce the gain factor of the HS-DPCCH, so that total uplink transmit power of the UE does not exceed the maximum allowed transmit power, or reduce the gain factor of the HS-DPCCH to a third preset gain factor threshold.

With reference to the second aspect, in a seventh possible implementation manner of the foregoing second aspect, the second-type channel includes a dedicated physical control channel (DPCCH) and a dedicated physical data channel (DPDCH); and correspondingly, the second reduction module includes: a fourth reduction unit, configured to reduce a gain factor of the DPCCH and a gain factor of the DPDCH, so that total uplink transmit power of the UE does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

With reference to the seventh possible implementation manner of the second aspect, in an eighth possible implementation manner of the foregoing second aspect, the second reduction module further includes: a fifth reduction unit, configured to reduce the gain factor of the first-type channel, where a ratio of a reduced gain factor of the first-type channel to the reduced gain factor of the DPCCH equals a ratio of the gain factor of the first-type channel before reduction to the gain factor of the DPCCH before reduction.

According to a third aspect, an apparatus for controlling transmit power of a user equipment is provided, including: a first processor, configured to reduce a gain factor of a first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel; and a second processor, configured to determine total uplink transmit power of the UE and if the total uplink transmit power of the UE exceeds the maximum allowed transmit power and the gain factor of the first-type channel is reduced to a preset gain factor threshold, reduce a gain factor of a second-type channel of the UE, so that total uplink transmit power of the UE does not exceed the maximum allowed transmit power, where the second-type channel includes a dedicated physical channel, where the dedicated physical channel includes a dedicated physical control channel and a dedicated physical data channel.

With reference to the third aspect, in a first possible implementation manner of the foregoing third aspect, the first-type channel includes a high speed dedicated physical control channel (HS-DPCCH); and correspondingly, the first processor is configured to: when the total uplink transmit power of the UE exceeds the maximum allowed transmit power, reduce a gain factor of the HS-DPCCH, so that total uplink transmit power of the UE does not exceed the maximum allowed transmit power, or reduce a gain factor of the HS-DPCCH to a first preset gain factor threshold.

With reference to the third aspect, in a second possible implementation manner of the foregoing third aspect, the first-type channel includes an enhanced dedicated physical data channel (E-DPDCH), an enhanced dedicated physical control channel (E-DPCCH) and a high speed dedicated physical control channel (HS-DPCCH); and correspondingly, the first processor is configured to reduce a gain factor of the E-DPDCH when the total uplink transmit power of the UE exceeds the maximum allowed transmit power; and determine total uplink transmit power of the UE and if the total uplink transmit power of the UE exceeds the maximum allowed transmit power and transmit power of the E-DPDCH is reduced to 0, reduce gain factors of the E-DPCCH and the HS-DPCCH.

With reference to the second possible implementation manner of the third aspect, in a third possible implementation manner of the foregoing third aspect, the first processor is configured to reduce a gain factor of the E-DPCCH; and determine total uplink transmit power of the UE and if the total uplink transmit power of the UE exceeds the maximum allowed transmit power and the gain factor of the E-DPCCH is reduced to a second preset gain factor threshold, reduce a gain factor of the HS-DPCCH.

With reference to the second possible implementation manner of the third aspect, in a fourth possible implementation manner of the foregoing third aspect, the first processor is configured to reduce a gain factor of the HS-DPCCH; and determine total uplink transmit power of the UE and if the total uplink transmit power of the UE exceeds the maximum allowed transmit power and the gain factor of the HS-DPCCH is reduced to a first preset gain factor threshold, reduce a gain factor of the E-DPCCH.

With reference to the third possible implementation manner of the third aspect or the fourth possible implementation manner of the third aspect, in a fifth possible implementation manner of the foregoing third aspect, the first processor is configured to: if a current timeslot of the UE is a timeslot used to transmit channel quality indicator CQI information of the HS-DPCCH, reduce the gain factor of the HS-DPCCH, so that total uplink transmit power of the UE does not exceed the maximum allowed transmit power, or reduce the gain factor of the HS-DPCCH to 0.

With reference to the third possible implementation manner of the third aspect or the fourth possible implementation manner of the third aspect, in a sixth possible implementation manner of the foregoing third aspect, the first processor is configured to: if a current timeslot of the UE is a timeslot used to transmit positive acknowledgement/negative acknowledgement (ACK/NACK) information of the HS-DPCCH, reduce the gain factor of the HS-DPCCH, so that total uplink transmit power of the UE does not exceed the maximum allowed transmit power, or reduce the gain factor of the HS-DPCCH to a third preset gain factor threshold.

With reference to the third aspect, in a seventh possible implementation manner of the foregoing third aspect, the second-type channel includes a dedicated physical control channel (DPCCH) and a dedicated physical data channel (DPDCH); and correspondingly, the second processor is configured to reduce a gain factor of the DPCCH and a gain factor of the DPDCH, so that total uplink transmit power of the UE does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

With reference to the seventh possible implementation manner of the third aspect, in an eighth possible implementation manner of the foregoing third aspect, the second processor is further configured to reduce the gain factor of the first-type channel, where a ratio of a reduced gain factor of the first-type channel to the reduced gain factor of the DPCCH equals a ratio of the gain factor of the first-type channel before reduction to the gain factor of the DPCCH before reduction.

In the embodiments of the present invention, when total uplink transmit power of a UE exceeds maximum allowed transmit power, the UE first reduces a gain factor of a first-type channel; and if the gain factor of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention and a person of ordinary skill in the art may still derive other drawings from these accompanying drawings without creative efforts.

DETAILED DESCRIPTION OF ILLUSTRATIVE EMBODIMENTS

To make the objectives, technical solutions and advantages of the present invention clearer, the following further describes the embodiments of the present invention in detail with reference to the accompanying drawings.

Figure 1:
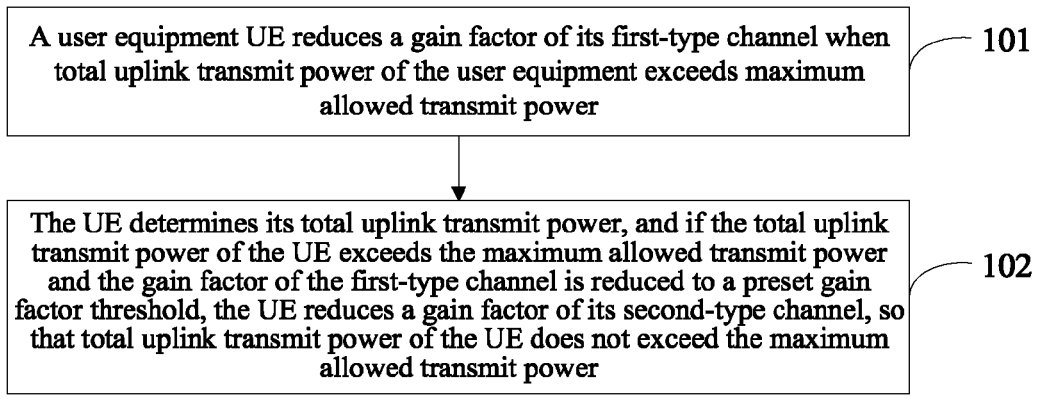
FIG. 1 is a flowchart of a method for controlling transmit power of a user equipment according to an embodiment of the present invention.

An embodiment of the present invention provides a method for controlling transmit power of a user equipment and as shown in FIG. 1, the method includes the following steps.

Step 101: The UE reduces a gain factor of first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel.

Step 102: The UE determines its total uplink transmit power and if the total uplink transmit power of the UE exceeds the maximum allowed transmit power and the gain factor of the first-type channel is reduced to a preset gain factor threshold, the UE reduces a gain factor of its second-type channel, so that total uplink transmit power of the UE does not exceed the maximum allowed transmit power, where the second-type channel includes a dedicated physical channel, where the dedicated physical channel includes a dedicated physical control channel and a dedicated physical data channel.

In the embodiment of the present invention, when total uplink transmit power of a UE exceeds maximum allowed transmit power, the UE first reduces a gain factor of a first-type channel; and if transmit power of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

Figure 2:
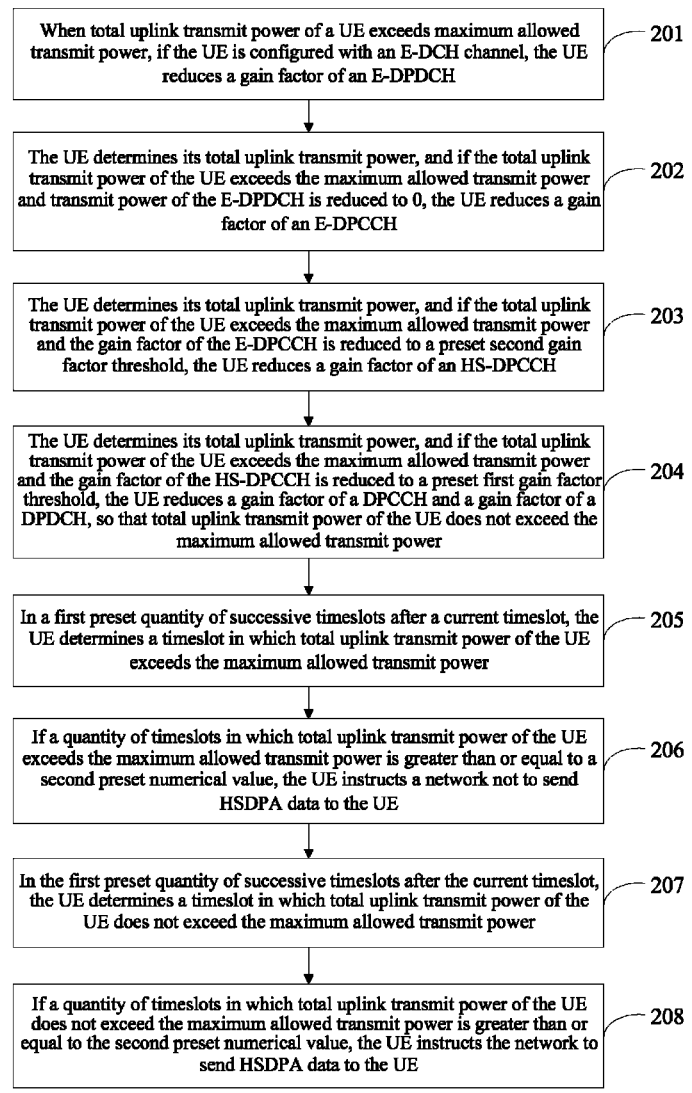
FIG. 2 is a flowchart of another method for controlling transmit power of a user equipment according to an embodiment of the present invention.

An embodiment of the present invention provides a method for controlling transmit power of a user equipment and referring to FIG. 2, the method is described as follows.

Step 201: When total uplink transmit power of the UE exceeds maximum allowed transmit power and if the UE is configured with an E-DCH channel, the UE reduces a gain factor of an E-DPDCH.

In another embodiment of the present invention, step 201 may include the following steps (1) to (2).

(1) When the total uplink transmit power of the UE exceeds the maximum allowed transmit power and if the UE is configured with an E-DCH channel, the UE reduces the gain factor of the E-DPDCH by a first preset gain factor.

In another embodiment of the present invention, the total uplink transmit power of the UE is determined; the total uplink transmit power of the UE is compared with the maximum allowed transmit power; if the total uplink transmit power of the UE exceeds the maximum allowed transmit power, whether the UE is configured with an E-DCH channel is determined; and if the UE is configured with an E-DCH channel, the gain factor of the E-DPDCH is reduced by the first preset gain factor.

The E-DCH channel includes an uplink E-DCH dedicated physical data channel E-DPDCH and an uplink E-DCH dedicated physical control channel E-DPCCH.

The first preset gain factor is predefined by the UE, or may be configured by a network for the UE.

If the UE is not configured with an E-DCH channel, a gain factor of an HS-DPCCH is directly reduced.

(2) The UE determines its total uplink transmit power; if the total uplink transmit power of the UE exceeds the maximum allowed transmit power, the UE determines whether transmit power of the E-DPDCH is 0; and if the transmit power of the E-DPDCH is 0, executes step 202; or if the transmit power of the E-DPDCH is not 0, returns to step (1).

The step of reducing a gain factor of an E-DPDCH includes: calculating a first difference between the total uplink transmit power and the maximum allowed transmit power that are of the UE; comparing the first difference with the transmit power of the E-DPDCH; and if the first difference is greater than or equal to the transmit power of the E-DPDCH, directly reducing the gain factor of the E-DPDCH to 0; or if the first difference is less than the transmit power of the E-DPDCH, determining transmit power of a DPCCH, dividing the first difference by the transmit power of the DPCCH to obtain a first ratio and reducing the gain factor of the E-DPDCH by the first ratio.

Step 202: The UE determines its total uplink transmit power and if the total uplink transmit power of the UE exceeds the maximum allowed transmit power and the transmit power of the E-DPDCH is reduced to 0, the UE reduces a gain factor of an E-DPCCH.

In another embodiment of the present invention, the total uplink transmit power of the UE is determined; the total uplink transmit power of the UE is compared with the maximum allowed transmit power; if the total uplink transmit power of the UE exceeds the maximum allowed transmit power, whether the transmit power of the E-DPDCH is 0 is determined; if the transmit power of the E-DPDCH is reduced to 0, the gain factor of the E-DPCCH is reduced by a second preset gain factor; total uplink transmit power of the UE is determined; and if the total uplink transmit power of the UE exceeds the maximum allowed transmit power, a gain factor of the E-DPCCH is further reduced by the second preset gain factor, so that total uplink transmit power of the UE does not exceed the maximum allowed transmit power, or a gain factor of the E-DPCCH is reduced to a second preset gain factor threshold.

Preferably, the step of reducing a gain factor of an E-DPCCH includes: calculating a second difference between the total uplink transmit power and the maximum allowed transmit power that are of the UE and calculating a third difference between the transmit power of the E-DPCCH and a lowest power threshold of the E-DPCCH; comparing the second difference with the third difference; and if the second difference is greater than or equal to the third difference, directly reducing the gain factor of the E-DPCCH to the second preset gain factor threshold; or if the second difference is less than the third difference, determining the transmit power of the DPCCH, dividing the second difference by the transmit power of the DPCCH to obtain a second ratio and reducing the gain factor of the E-DPCCH by the second ratio.

The second preset gain factor is predefined by the UE, or may be configured by the network for the UE.

The second preset gain factor threshold is predefined by the UE, or may be configured by the network and the second preset gain factor threshold may be a numerical value greater than 0, or may be 0.

Step 203: The UE determines its total uplink transmit power and if the total uplink transmit power of the UE exceeds the maximum allowed transmit power and the gain factor of the E-DPCCH is reduced to a second preset gain factor threshold, the UE reduces a gain factor of an HS-DPCCH.

In another embodiment of the present invention, step 203 may include the following steps (1) to (3).

(1) The UE determines its total uplink transmit power and if the total uplink transmit power of the UE exceeds the maximum allowed transmit power, the UE determines whether the gain factor of the E-DPCCH is reduced to the second preset gain factor threshold.

In another embodiment of the present invention, the UE determines its total uplink transmit power; compares the total uplink transmit power of the UE with the maximum allowed transmit power; and if the total uplink transmit power of the UE exceeds the maximum allowed transmit power, the UE determines whether the gain factor of the E-DPCCH is reduced to the second preset gain factor threshold.

(2) If the gain factor of the E-DPCCH is reduced to the second preset gain factor threshold and a current timeslot of the UE is a timeslot used to transmit CQI information of the HS-DPCCH, the UE reduces the gain factor of the HS-DPCCH, so that total uplink transmit power of the UE does not exceed the maximum allowed transmit power, or the UE reduces the gain factor of the HS-DPCCH to 0.

In another embodiment of the present invention, if the gain factor of the E-DPCCH is reduced to the second preset gain factor threshold and the current timeslot of the UE is a timeslot used to transmit CQI information of the HS-DPCCH, the gain factor of the HS-DPCCH is reduced by a third preset gain factor; total uplink transmit power of the UE is determined; and if the total uplink transmit power of the UE exceeds the maximum allowed transmit power, a gain factor of the HS-DPCCH is further reduced, so that total uplink transmit power of the UE does not exceed the maximum allowed transmit power, or a gain factor of the HS-DPCCH is reduced to 0.

Preferably, if the gain factor of the E-DPCCH is reduced to the second preset gain factor threshold and the current timeslot of the UE is a timeslot used to transmit CQI information of the HS-DPCCH, a fourth difference between the total uplink transmit power and the maximum allowed transmit power that are of the UE is calculated; the fourth difference is compared with transmit power of the HS-DPCCH; and if the fourth difference is greater than or equal to the transmit power of the HS-DPCCH, the gain factor of the HS-DPCCH is directly reduced to 0; or if the fourth difference is less than the transmit power of the HS-DPCCH, the transmit power of the DPCCH is determined, dividing the fourth difference by the transmit power of the DPCCH to obtain a third ratio and the gain factor of the HS-DPCCH is reduced by the third ratio.

The third preset gain factor is predefined by the UE, or may be configured by the network for the UE.

(3) If the gain factor of the E-DPCCH is reduced to the second preset gain factor threshold and the current timeslot of the UE is a timeslot used to transmit ACK/NACK information of the HS-DPCCH, the UE reduces the gain factor of the HS-DPCCH, so that total uplink transmit power of the UE does not exceed the maximum allowed transmit power, or the UE reduces the gain factor of the HS-DPCCH to a third preset gain factor threshold.

In another embodiment of the present invention, if the gain factor of the E-DPCCH is reduced to the second preset gain factor threshold and the current timeslot of the UE is a timeslot used to transmit ACK/NACK information of the HS-DPCCH, the gain factor of the HS-DPCCH is reduced by a fourth preset gain factor; the UE determines its total uplink transmit power; and if the total uplink transmit power of the UE exceeds the maximum allowed transmit power, the UE further reduces a gain factor of the HS-DPCCH, so that total uplink transmit power of the UE does not exceed the maximum allowed transmit power, or the UE reduces a gain factor of the HS-DPCCH to the third preset gain factor threshold.

Preferably, if the gain factor of the E-DPCCH is reduced to the second preset gain factor threshold and the current timeslot of the UE is a timeslot used to transmit ACK/NACK information of the HS-DPCCH, a fifth difference between the total uplink transmit power and the maximum allowed transmit power that are of the UE is calculated and a sixth difference between the transmit power of the HS-DPCCH and a lowest power threshold of the HS-DPCCH is calculated; the fifth difference is compared with the sixth difference; and if the fifth difference is greater than or equal to the sixth difference, the gain factor of the HS-DPCCH is directly reduced to the third preset gain factor threshold; or if the fifth difference is less than the sixth difference, the UE determines the transmit power of the DPCCH, dividing on the fifth difference by the transmit power of the DPCCH to obtain a fourth ratio and reduces the gain factor of the HS-DPCCH by the fourth ratio.

The fourth preset gain factor is predefined by the UE, or may be configured by the network for the UE.

The third preset gain factor threshold is greater than 0 and the third preset gain factor threshold may be predefined by the UE, or may be configured by the network.

The ACK/NACK information is a response of the UE to the network about whether downlink data sent by the network is received by the UE and therefore, transmit power of the HS-DPCCH channel on which the ACK/NACK information is sent is not reduced to 0 if possible.

When the total uplink transmit power of the UE exceeds the maximum allowed transmit power and the transmit power of the E-DPDCH is reduced to 0, the gain factor of the E-DPCCH may be preferably reduced and then the gain factor of the HS-DPCCH is reduced, or the gain factor of the HS-DPCCH may be preferably reduced and then the gain factor of the E-DPCCH is reduced. Order of reducing the gain factor of the E-DPCCH and reducing the gain factor of the HS-DPCCH is not limited in this application and in this embodiment, an example that the gain factor of the HS-DPCCH is reduced after the gain factor of the E-DPCCH is reduced is used for description.

Step 204: The UE determines its total uplink transmit power and if the total uplink transmit power of the UE exceeds the maximum allowed transmit power and the gain factor of the HS-DPCCH is reduced to a first preset gain factor threshold, the UE reduces a gain factor of a DPCCH and a gain factor of a DPDCH, so that total uplink transmit power of the UE does not exceed the maximum allowed transmit power.

In another embodiment of the present invention, step 204 may include the following steps (1) to (2).

(1) The UE determines its total uplink transmit power and if the total uplink transmit power of the UE exceeds the maximum allowed transmit power, the UE determines whether the gain factor of the HS-DPCCH is reduced to the first preset gain factor threshold.

In another embodiment of the present invention, the UE determines its total uplink transmit power; if the total uplink transmit power of the UE exceeds the maximum allowed transmit power and the current timeslot of the UE is a timeslot used to transmit ACK/NACK information of the HS-DPCCH, the UE determines whether the gain factor of the HS-DPCCH is reduced to the third preset gain factor threshold; or if the total uplink transmit power of the UE exceeds the maximum allowed transmit power and the current timeslot of the UE is a timeslot used to transmit CQI information of the HS-DPCCH, the UE determines whether the transmit power of the HS-DPCCH is reduced to 0.

The first preset gain factor threshold includes 0 and the third preset gain factor threshold.

(2) If the gain factor of the HS-DPCCH is reduced to the first preset gain factor threshold, the UE reduces the gain factor of the DPCCH and the gain factor of the DPDCH.

In another embodiment of the present invention, if the gain factor of the HS-DPCCH is reduced to the first preset gain factor threshold, the UE reduces the gain factor of the DPCCH and the gain factor of the DPDCH, where a ratio of a reduced gain factor of the DPDCH to a reduced gain factor of the DPCCH equals a first preset ratio.

The first preset ratio is a ratio of the gain factor of the DPDCH before reduction to the gain factor of the DPCCH before reduction and the first preset ratio is configured by the network for the UE.

Preferably, the UE determines its total uplink transmit power; and if the total uplink transmit power of the UE exceeds the maximum allowed transmit power and the gain factor of the HS-DPCCH is reduced to the first preset gain factor threshold, the UE reduces the gain factor of the E-DPCCH, the gain factor of the HS-DPCCH, the gain factor of the DPCCH and the gain factor of the DPDCH, so that total uplink transmit power of the UE does not exceed the maximum allowed transmit power, a ratio of a reduced gain factor of the E-DPCCH to the reduced gain factor of the DPCCH equals a ratio of the gain factor of the E-DPCCH before reduction to the gain factor of the DPCCH before reduction, a ratio of a reduced gain factor of the HS-DPCCH to the reduced gain factor of the DPCCH equals a ratio of the gain factor of the HS-DPCCH before reduction to the gain factor of the DPCCH before reduction and the ratio of the reduced gain factor of the DPDCH to the reduced gain factor of the DPCCH equals the first preset ratio.

The first preset ratio is the ratio of the gain factor of the DPDCH before reduction to the gain factor of the DPCCH before reduction.

When ACK/NACK information is transmitted by an HS-PDCCH in a current timeslot and the transmit power of the E-DPCCH is not reduced to 0, the foregoing preferable step is executed.

Further, when the total uplink transmit power of the UE exceeds the maximum allowed transmit power, the UE may instruct, according to total uplink transmit power of each timeslot, the network whether to send HSDPA data to the UE and the method for controlling transmit power of a user equipment further includes the following steps.

Step 205: In a first preset quantity of successive timeslots after a current timeslot, the UE determines a timeslot in which total uplink transmit power of the UE exceeds the maximum allowed transmit power.

In another embodiment of the present invention, in the first preset quantity of successive timeslots after the current timeslot, total uplink transmit power of the UE, in each timeslot of the first preset quantity of timeslots, is compared with the maximum allowed transmit power, so as to determine a timeslot in which the total uplink transmit power of the UE exceeds the maximum allowed transmit power.

Step 206: If a quantity of timeslots in which total uplink transmit power of the UE exceeds the maximum allowed transmit power is greater than or equal to a second preset numerical value, the UE instructs a network not to send HSDPA data to the UE.

In another embodiment of the present invention, the quantity of timeslots in which total uplink transmit power of the UE exceeds the maximum allowed transmit power is counted; and if the quantity of timeslots in which total uplink transmit power of the UE exceeds the maximum allowed transmit power is greater than or equal to the second preset numerical value, it is determined that abnormality occurs on a downlink of the UE and the UE sends a stop-scheduling instruction to the network, so that the network stops sending HSDPA data to the UE.

Optionally, a method that the UE instructs the network to stop sending HSDPA data to the UE includes: in a third preset quantity of successive timeslots after the current timeslot, determining whether total uplink transmit power of the UE, in each timeslot of the third preset quantity of timeslots, exceeds the maximum allowed transmit power; and if the total uplink transmit power of the UE, in each of the third preset quantity of timeslots, exceeds the maximum allowed transmit power, determining that abnormality occurs on the downlink of the UE and sending, by the UE, the stop-scheduling instruction to the network, so that the network stops sending HSDPA data to the UE.

Further, when the UE instructs the network to stop sending HSDPA data to the UE, the UE detects whether its total uplink transmit power exceeds the maximum allowed transmit power and it is determined, according to the total uplink transmit power of the UE, whether the network is to resume sending HSDPA data to the UE, which is specifically as follows:

Step 207: In the first preset quantity of successive timeslots after the current timeslot, the UE determines a timeslot in which total uplink transmit power of the UE does not exceed the maximum allowed transmit power.

In another embodiment of the present invention, in the first preset quantity of successive timeslots after the current timeslot, the total uplink transmit power of the UE, in each timeslot of the first preset quantity of timeslots, is compared with the maximum allowed transmit power, so as to determine a timeslot in which the total uplink transmit power of the UE does not exceed the maximum allowed transmit power.

Step 208: If a quantity of timeslots in which total uplink transmit power of the UE does not exceed the maximum allowed transmit power is greater than or equal to the second preset numerical value, the UE instructs the network to send HSDPA data to the UE.

In another embodiment of the present invention, the quantity of timeslots in which total uplink transmit power of the UE does not exceed the maximum allowed transmit power is counted; and if the quantity of timeslots in which total uplink transmit power of the UE does not exceed the maximum allowed transmit power is greater than or equal to the second preset numerical value, it is determined that the downlink of the UE is restored to normal and the UE sends a scheduling instruction to the network, so that the network sends HSDPA data to the UE.

Optionally, a method for instructing the network to resume sending HSDPA data to the UE includes: in the third preset quantity of successive timeslots after the current timeslot, determining whether the total uplink transmit power of the UE, in each timeslot of the third preset quantity of timeslots, exceeds the maximum allowed transmit power; and if the total uplink transmit power of the UE, in each of the third preset quantity of timeslots, does not exceed the maximum allowed transmit power, determining that the downlink of the UE is restored to normal and sending, by the UE, the scheduling instruction to the network, so that the network sends HSDPA data to the UE.

In the embodiment of the present invention, when total uplink transmit power of a UE exceeds maximum allowed transmit power, the UE first reduces a gain factor of a first-type channel; and if the gain factor of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

Figure 3:
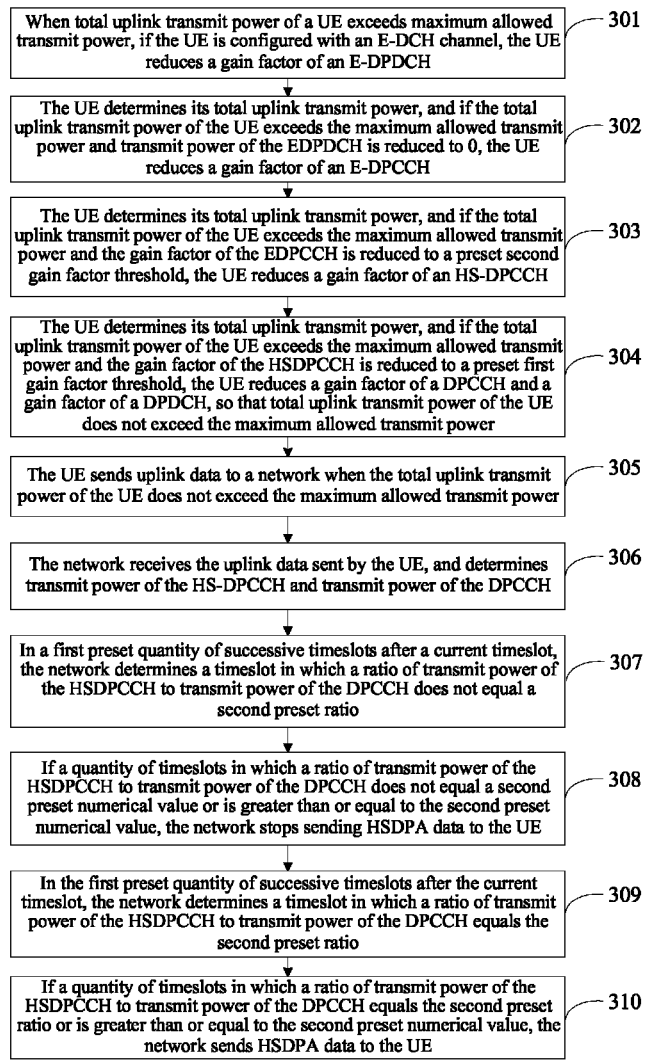
FIG. 3 is a flowchart of another method for controlling transmit power of a user equipment according to an embodiment of the present invention.

An embodiment of the present invention provides a method for controlling transmit power of a user equipment and referring to FIG. 3, the method is described as follows.

Step 301: When total uplink transmit power of the UE exceeds maximum allowed transmit power and if the UE is configured with an E-DCH channel, the UE reduces a gain factor of an E-DPDCH.

In another embodiment of the present invention, step 301 may include the following steps (1) to (2).

(1) When the total uplink transmit power of the UE exceeds the maximum allowed transmit power and if the UE is configured with an E-DCH channel, the UE reduces the gain factor of the E-DPDCH by a first preset gain factor.

In another embodiment of the present invention, the total uplink transmit power of the UE is determined; the total uplink transmit power of the UE is compared with the maximum allowed transmit power; if the total uplink transmit power of the UE exceeds the maximum allowed transmit power, whether the UE is configured with an E-DCH channel is determined; and if the UE is configured with an E-DCH channel, the gain factor of the E-DPDCH is reduced by the first preset gain factor.

The E-DCH channel includes an uplink E-DCH dedicated physical data channel E-DPDCH and an uplink E-DCH dedicated physical control channel E-DPCCH.

The first preset gain factor is predefined by the UE, or may be configured by a network for the UE.

If the UE is not configured with an E-DCH channel, a gain factor of an HS-DPCCH is directly reduced.

(2) The UE determines its total uplink transmit power; if the total uplink transmit power of the UE exceeds the maximum allowed transmit power, the UE determines whether transmit power of the E-DPDCH is 0; and if the transmit power of the E-DPDCH is 0, executes step 302; if the transmit power of the E-DPDCH is not 0, returns to step (1).

The step of reducing a gain factor of an E-DPDCH includes: calculating a first difference between the total uplink transmit power and the maximum allowed transmit power that are of the UE; comparing the first difference with the transmit power of the E-DPDCH; and if the first difference is greater than or equal to the transmit power of the E-DPDCH, directly reducing the gain factor of the E-DPDCH to 0; or if the first difference is less than the transmit power of the E-DPDCH, determining transmit power of a DPCCH, dividing the first difference by the transmit power of the DPCCH to obtain a first ratio and reducing the gain factor of the E-DPDCH by the first ratio.

Step 302: The UE determines its total uplink transmit power and if the total uplink transmit power of the UE exceeds the maximum allowed transmit power and the transmit power of the E-DPDCH is reduced to 0, the UE reduces a gain factor of an E-DPCCH.

In another embodiment of the present invention, the UE determines the total uplink transmit power of the UE; the total uplink transmit power of the UE is compared with the maximum allowed transmit power; if the total uplink transmit power of the UE exceeds the maximum allowed transmit power, whether the transmit power of the E-DPDCH is 0 is determined; if the transmit power of the E-DPDCH is reduced to 0, the gain factor of the E-DPCCH is reduced by a second preset gain factor; total uplink transmit power of the UE is determined; if the total uplink transmit power of the UE exceeds the maximum allowed transmit power, a gain factor of the E-DPCCH is further reduced by the second preset gain factor, so that total uplink transmit power of the UE does not exceed the maximum allowed transmit power, or a gain factor of the E-DPCCH is reduced to a second preset gain factor threshold.

Preferably, the step of reducing a gain factor of an E-DPCCH includes: calculating a second difference between the total uplink transmit power and the maximum allowed transmit power that are of the UE and calculating a third difference between the transmit power of the E-DPCCH and a lowest power threshold of the E-DPCCH; comparing the second difference with the third difference; and if the second difference is greater than or equal to the third difference, directly reducing the gain factor of the E-DPCCH to the second preset gain factor threshold; or if the second difference is less than the third difference, determining the transmit power of the DPCCH, dividing the second difference by the transmit power of the DPCCH to obtain a second ratio and reducing the gain factor of the E-DPCCH by the second ratio.

The second preset gain factor is predefined by the UE, or may be configured by the network for the UE.

The second preset gain factor threshold is predefined by the UE, or may be configured by the network and the second preset gain factor threshold may be a numerical value greater than 0, or may be 0.

Step 303: The UE determines its total uplink transmit power and if the total uplink transmit power of the UE exceeds the maximum allowed transmit power and the gain factor of the E-DPCCH is reduced to a second preset gain factor threshold, a gain factor of an HS-DPCCH is reduced.

In another embodiment of the present invention, step 303 may include the following steps (1) to (3).

(1) The UE determines its total uplink transmit power and if the total uplink transmit power of the UE exceeds the maximum allowed transmit power, the UE determines whether the gain factor of the E-DPCCH is reduced to the second preset gain factor threshold.

In another embodiment of the present invention, the UE determines its total uplink transmit power; compares the total uplink transmit power of the UE with the maximum allowed transmit power; and if the total uplink transmit power of the UE exceeds the maximum allowed transmit power, the UE determines whether the gain factor of the E-DPCCH is reduced to the second preset gain factor threshold.

(2) If the gain factor of the E-DPCCH is reduced to the second preset gain factor threshold and a current timeslot of the UE is a timeslot used to transmit CQI information of the HS-DPCCH, the UE reduces the gain factor of the HS-DPCCH, so that total uplink transmit power of the UE does not exceed the maximum allowed transmit power, or the UE reduces the gain factor of the HS-DPCCH to 0.

In another embodiment of the present invention, if the gain factor of the E-DPCCH is reduced to the second preset gain factor threshold and the current timeslot of the UE is a timeslot used to transmit CQI information of the HS-DPCCH, the gain factor of the HS-DPCCH is reduced by a third preset gain factor; total uplink transmit power of the UE is determined; and if the total uplink transmit power of the UE exceeds the maximum allowed transmit power, a gain factor of the HS-DPCCH is further reduced, so that total uplink transmit power of the UE does not exceed the maximum allowed transmit power, or transmit power of the HS-DPCCH is reduced to 0.

Preferably, if the gain factor of the E-DPCCH is reduced to the second preset gain factor threshold and the current timeslot of the UE is a timeslot used to transmit CQI information of the HS-DPCCH, a fourth difference between the total uplink transmit power and the maximum allowed transmit power that are of the UE is calculated; the fourth difference is compared with the transmit power of the HS-DPCCH; and if the fourth difference is greater than or equal to the transmit power of the HS-DPCCH, the gain factor of the HS-DPCCH is directly reduced to 0; or if the fourth difference is less than the transmit power of the HS-DPCCH, the transmit power of the DPCCH is determined, dividing the fourth difference by the transmit power of the DPCCH to obtain a third ratio and the gain factor of the HS-DPCCH is reduced by the third ratio.

The third preset gain factor is predefined by the UE, or may be configured by the network for the UE.

(3) If the gain factor of the E-DPCCH is reduced to the second preset gain factor threshold and the current timeslot of the UE is a timeslot used to transmit ACK/NACK information of the HS-DPCCH, the UE reduces the gain factor of the HS-DPCCH, so that total uplink transmit power of the UE does not exceed the maximum allowed transmit power, or the UE reduces the gain factor of the HS-DPCCH to a third preset gain factor threshold.

In another embodiment of the present invention, if the gain factor of the E-DPCCH is reduced to the second preset gain factor threshold and the current timeslot of the UE is a timeslot used to transmit ACK/NACK information of the HS-DPCCH, the gain factor of the HS-DPCCH is reduced by a fourth preset gain factor; the UE determines its total uplink transmit power; and if the total uplink transmit power of the UE exceeds the maximum allowed transmit power, the UE further reduces a gain factor of the HS-DPCCH, so that total uplink transmit power of the UE does not exceed the maximum allowed transmit power, or the UE reduces a gain factor of the HS-DPCCH to the third preset gain factor threshold.

Preferably, if the gain factor of the E-DPCCH is reduced to the second preset gain factor threshold and the current timeslot of the UE is a timeslot used to transmit ACK/NACK information of the HS-DPCCH, a fifth difference between the total uplink transmit power and the maximum allowed transmit power that are of the UE is calculated and a sixth difference between the transmit power of the HS-DPCCH and a lowest power threshold of the HS-DPCCH is calculated; the fifth difference is compared with the sixth difference; and if the fifth difference is greater than or equal to the sixth difference, the gain factor of the HS-DPCCH is directly reduced to the third preset gain factor threshold; or if the fifth difference is less than the sixth difference, the UE determines the transmit power of the DPCCH, dividing the fifth difference by the transmit power of the DPCCH to obtain a fourth ratio and reduces the gain factor of the HS-DPCCH by the fourth ratio.

The fourth preset gain factor is predefined by the UE, or may be configured by the network for the UE.

The third preset gain factor threshold does not equal 0 and is greater than 0 and the third preset gain factor threshold may be predefined by the UE, or may be configured by the network.

The ACK/NACK information is a response of the UE to the network about whether downlink data sent by the network is received by the UE and therefore, transmit power of the HS-DPCCH channel on which the ACK/NACK information is sent is not reduced to 0 if possible.

When the total uplink transmit power of the UE exceeds the maximum allowed transmit power and the transmit power of the E-DPDCH is reduced to 0, the gain factor of the E-DPCCH may be preferably reduced and then the gain factor of the HS-DPCCH is reduced, or the gain factor of the HS-DPCCH may be preferably reduced and then the gain factor of the E-DPCCH is reduced. Order of reducing the gain factor of the E-DPCCH and reducing the gain factor of the HS-DPCCH is not limited in this application and in this embodiment, an example that the gain factor of the HS-DPCCH is reduced after the gain factor of the E-DPCCH is reduced is used for description.

Step 304: The UE determines its total uplink transmit power and if the total uplink transmit power of the UE exceeds the maximum allowed transmit power and the gain factor of the HS-DPCCH is reduced to a first preset gain factor threshold, the UE reduces a gain factor of a DPCCH and a gain factor of a DPDCH, so that total uplink transmit power of the UE does not exceed the maximum allowed transmit power.

In another embodiment of the present invention, step 304 may include the following steps (1) to (2).

(1) The UE determines its total uplink transmit power and if the total uplink transmit power of the UE exceeds the maximum allowed transmit power, the UE determines whether the gain factor of the HS-DPCCH is reduced to the first preset gain factor threshold.

In another embodiment of the present invention, the UE determines its total uplink transmit power; if the total uplink transmit power of the UE exceeds the maximum allowed transmit power and the current timeslot of the UE is a timeslot used to transmit ACK/NACK information of the HS-DPCCH, the UE determines whether the gain factor of the HS-DPCCH is reduced to the third preset gain factor threshold; or if the total uplink transmit power of the UE exceeds the maximum allowed transmit power and the current timeslot of the UE is a timeslot used to transmit CQI information of the HS-DPCCH, the UE determines whether the transmit power of the HS-DPCCH is reduced to 0.

The first preset gain factor threshold includes 0 and the third preset gain factor threshold.

(2) The UE reduces the gain factor of the DPCCH and the gain factor of the DPDCH if the gain factor of the HS-DPCCH is reduced to the first preset gain factor threshold.

In another embodiment of the present invention, the UE reduces the gain factor of the DPCCH and the gain factor of the DPDCH if the gain factor of the HS-DPCCH is reduced to the first preset gain factor threshold, where a ratio of a reduced gain factor of the DPDCH to a reduced gain factor of the DPCCH equals a first preset ratio.

The first preset ratio is a ratio of the gain factor of the DPDCH before reduction to the gain factor of the DPCCH before reduction and the first preset ratio is configured by the network for the UE.

Preferably, the UE determines its total uplink transmit power; and if the total uplink transmit power of the UE exceeds the maximum allowed transmit power and the gain factor of the HS-DPCCH is reduced to the first preset gain factor threshold, the UE reduces the gain factor of the E-DPCCH, the gain factor of the HS-DPCCH, the gain factor of the DPCCH and the gain factor of the DPDCH, so that total uplink transmit power of the UE does not exceed the maximum allowed transmit power, a ratio of a reduced gain factor of the E-DPCCH to the reduced gain factor of the DPCCH equals a ratio of the gain factor of the E-DPCCH before reduction to the gain factor of the DPCCH before reduction, a ratio of a reduced gain factor of the HS-DPCCH to the reduced gain factor of the DPCCH equals a ratio of the gain factor of the HS-DPCCH before reduction to the gain factor of the DPCCH before reduction and the ratio of the reduced gain factor of the DPDCH to the reduced gain factor of the DPCCH equals the first preset ratio.

When ACK/NACK information is transmitted by an HS-PDCCH in a current timeslot and the transmit power of the E-DPCCH is not reduced to 0, the foregoing preferable step is executed.

When the total uplink transmit power of the UE is reduced according to the foregoing step 301 to step 304, so that total uplink transmit power of the UE does not exceed the maximum allowed transmit power, the UE sends data to the network.

Step 305: The UE sends uplink data to a network when the total uplink transmit power of the UE does not exceed the maximum allowed transmit power.

Step 306: The network receives the uplink data sent by the UE and determines transmit power of the HS-DPCCH and transmit power of the DPCCH.

In another embodiment of the present invention, the network receives the uplink data sent by the UE, determines CQI information or ACK/NACK information sent by the UE to obtain the transmit power of the HS-DPCCH and determines the transmit power of the DPCCH.

Step 307: In a first preset quantity of successive timeslots after a current timeslot, the network determines a timeslot in which a ratio of transmit power of the HS-DPCCH to transmit power of the DPCCH does not equal a second preset ratio.

In another embodiment of the present invention, the network determines to calculate, in the first preset quantity of successive timeslots after the current timeslot, a first ratio of transmit power of the HS-DPCCH of each timeslot included in the first preset quantity of timeslots to transmit power of the DPCCH of each timeslot included in the first preset quantity of timeslots; and if the first ratio does not equal the second preset ratio, the timeslot in which the first ratio does not equal the second preset ratio is determined.

Step 308: The network stops sending HSDPA data to the UE if a quantity of timeslots in which a ratio of transmit power of the HS-DPCCH to transmit power of the DPCCH does not equal the second preset ratio is greater than or equal to a second preset numerical value.

In another embodiment of the present invention, a quantity of timeslots in which a ratio of transmit power of the HS-DPCCH to transmit power of the DPCCH does not equal the second preset ratio is counted; and if the quantity of timeslots in which a ratio of transmit power of the HS-DPCCH to transmit power of the DPCCH does not equal the second preset ratio is greater than or equal to the second preset numerical value, it is determined that abnormality occurs on a downlink of the UE and the network no longer sends HSDPA data to the UE.

Optionally, a method that the network stops sending HSDPA data to the UE includes: in a third preset quantity of successive timeslots after the current timeslot, determining whether a ratio of transmit power of the HS-DPCCH to transmit power of the DPCCH, in each timeslot of the third preset quantity of timeslots, equals the second preset ratio; and if the ratio of transmit power of the HS-DPCCH to transmit power of the DPCCH, in each of the third preset quantity of timeslots, does not equal the second preset ratio, determining that abnormality occurs on the downlink of the UE, so that the network no longer sends HSDPA data to the UE.

Further, after the network stops sending HSDPA data to the UE, the network determines, according to the transmit power of the HS-DPCCH and the transmit power of the DPCCH, whether to resume sending HSDPA data to the UE, which is specifically as follows:

Step 309: In the first preset quantity of successive timeslots after the current timeslot, the network determines a timeslot in which a ratio of transmit power of the HS-DPCCH to transmit power of the DPCCH equals the second preset ratio.

In another embodiment of the present invention, the network determines that CQI information or ACK/NACK information sent by the UE is received in the first preset quantity of successive timeslots after the current timeslot and the network determines that information sent by the DPCCH of the UE is received in the first preset quantity of successive timeslots after the current timeslot; the network determines the transmit power of the HS-DPCCH in each timeslot included in the first preset quantity of timeslots and the transmit power of the DPCCH in each timeslot included in the first preset quantity of timeslots, calculates a second ratio of the transmit power of the HS-DPCCH to the transmit power of the DPCCH in each timeslot and if the second ratio equals the second preset ratio, the network determines a timeslot in which the second ratio equals the second preset ratio.

Step 310: Send HSDPA data to the UE if a quantity of timeslots in which a ratio of transmit power of the HS-DPCCH to transmit power of the DPCCH equals the second preset ratio is greater than or equal to the second preset numerical value.

In another embodiment of the present invention, a quantity of timeslots in which a ratio of transmit power of the HS-DPCCH to transmit power of the DPCCH equals the second preset ratio is counted; and if the quantity of timeslots in which a ratio of transmit power of the HS-DPCCH to transmit power of the DPCCH equals the second preset ratio is greater than or equal to the second preset numerical value, it is determined that the downlink of the UE is restored to normal, so that the network resumes sending HSDPA data to the UE.

Optionally, a method that the network determines, according to transmit power of the HS-DPCCH and transmit power of the DPCCH, whether to resume sending HSDPA data to the UE includes: in the third preset quantity of successive timeslots after the current timeslot, determining whether the ratio of transmit power of the HS-DPCCH to transmit power of the DPCCH, in each timeslot of the third preset quantity of timeslots, equals the second preset ratio; and if the ratio of transmit power of the HS-DPCCH to transmit power of the DPCCH, in each of the third preset quantity of timeslots, equals the second preset ratio, determining that the downlink of the UE is restored to normal, so that the network resumes sending HSDPA data to the UE.

In the embodiment of the present invention, when total uplink transmit power of a UE exceeds maximum allowed transmit power, the UE first reduces a gain factor of a first-type channel; and if transmit power of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

Figure 4:
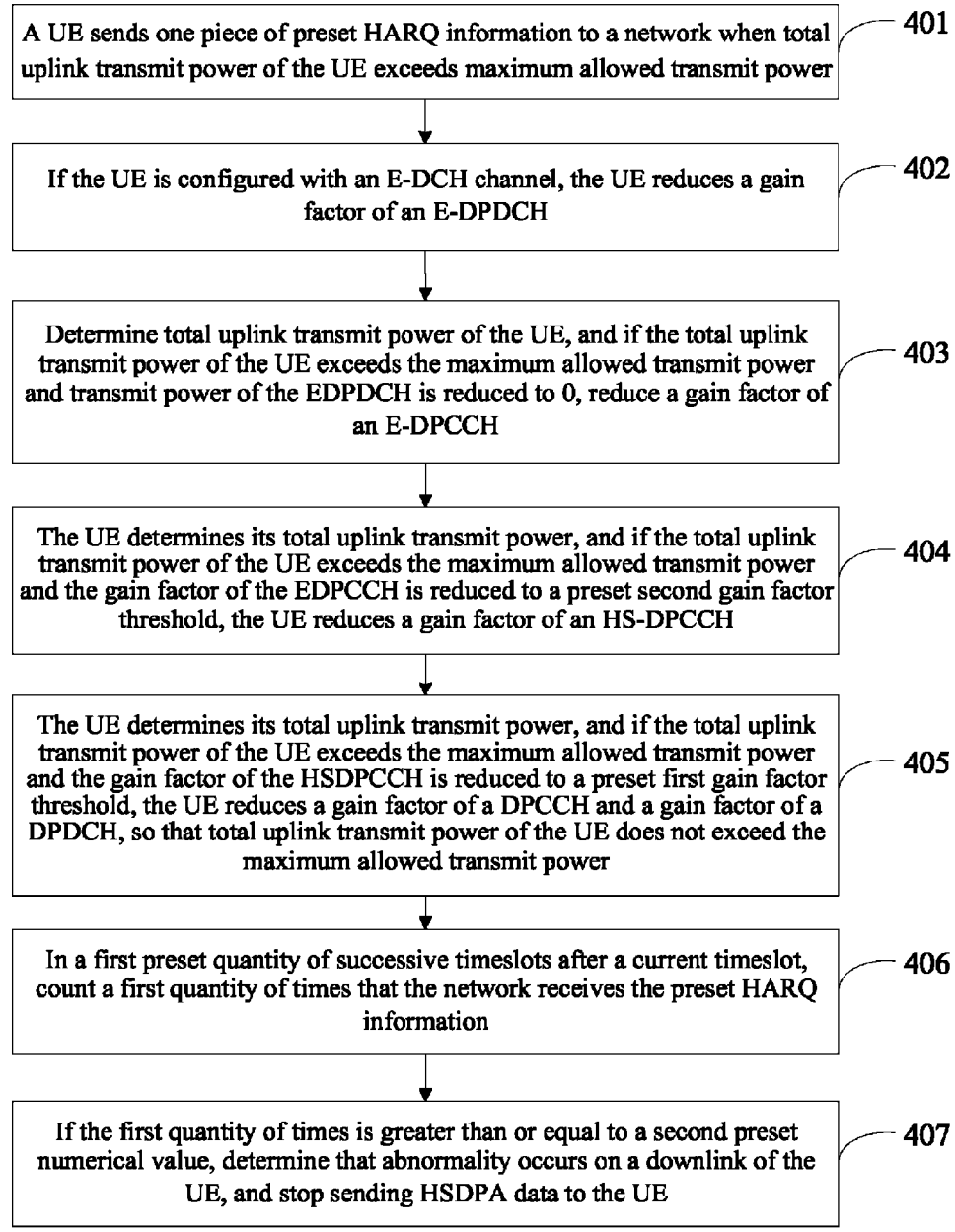
FIG. 4 is a flowchart of another method for controlling transmit power of a user equipment according to an embodiment of the present invention.

An embodiment of the present invention provides a method for controlling transmit power of a user equipment and as shown in FIG. 4.

Step 401: When total uplink transmit power of the UE exceeds maximum allowed transmit power, the UE sends one piece of preset HARQ information to a network.

The preset HARQ information is a special piece of information and when the total uplink transmit power of the UE does not exceed the maximum allowed transmit power, the UE does not send the preset HARQ information to the network.

Step 402: If the UE is configured with an E-DCH channel, the UE reduces a gain factor of an E-DPDCH.

In another embodiment of the present invention, step 402 may include the following steps (1) to (2).

(1) When the total uplink transmit power of the UE exceeds the maximum allowed transmit power and if the UE is configured with an E-DCH channel, the gain factor of the E-DPDCH is reduced by a first preset gain factor.

In another embodiment of the present invention, the total uplink transmit power of the UE is determined; the total uplink transmit power of the UE is compared with the maximum allowed transmit power; if the total uplink transmit power of the UE exceeds the maximum allowed transmit power, whether the UE is configured with an E-DCH channel is determined; and if the UE is configured with an E-DCH channel, the gain factor of the E-DPDCH is reduced by the first preset gain factor.

The E-DCH channel includes an uplink E-DCH dedicated physical data channel E-DPDCH and an uplink E-DCH dedicated physical control channel E-DPCCH.

The first preset gain factor is predefined by the UE, or may be configured by the network for the UE.

If the UE is not configured with an E-DCH channel, a gain factor of an HS-DPCCH is directly reduced.

(2) Total uplink transmit power of the UE is determined; if the total uplink transmit power of the UE exceeds the maximum allowed transmit power, whether transmit power of the E-DPDCH is 0 is determined; and if the transmit power of the E-DPDCH is 0, step 403 is executed; if the transmit power of the E-DPDCH is not 0, step (1) is executed again.

The step of reducing a gain factor of an E-DPDCH includes: calculating a first difference between the total uplink transmit power and the maximum allowed transmit power that are of the UE; comparing the first difference with the transmit power of the E-DPDCH; and if the first difference is greater than or equal to the transmit power of the E-DPDCH, directly reducing the gain factor of the E-DPDCH to 0; or if the first difference is less than the transmit power of the E-DPDCH, determining transmit power of a DPCCH, dividing the first difference by the transmit power of the DPCCH to obtain a first ratio and reducing the gain factor of the E-DPDCH by the first ratio.

Step 403: Total uplink transmit power of the UE is determined and if the total uplink transmit power of the UE exceeds the maximum allowed transmit power and the transmit power of the E-DPDCH is reduced to 0, a gain factor of an E-DPCCH is reduced.

In another embodiment of the present invention, the total uplink transmit power of the UE is determined; the total uplink transmit power of the UE is compared with the maximum allowed transmit power; if the total uplink transmit power of the UE exceeds the maximum allowed transmit power, whether the transmit power of the E-DPDCH is 0 is determined; if the transmit power of the E-DPDCH is reduced to 0, the gain factor of the E-DPCCH is reduced by a second preset gain factor; total uplink transmit power of the UE is determined; and if the total uplink transmit power of the UE exceeds the maximum allowed transmit power, a gain factor of the E-DPCCH is further reduced by the second preset gain factor, so that total uplink transmit power of the UE does not exceed the maximum allowed transmit power, or a gain factor of the E-DPCCH is reduced to a second preset gain factor threshold.

Preferably, the step of reducing a gain factor of an E-DPCCH includes: calculating a second difference between the total uplink transmit power and the maximum allowed transmit power that are of the UE and calculating a third difference between the transmit power of the E-DPCCH and a lowest power threshold of the E-DPCCH; comparing the second difference with the third difference; and if the second difference is greater than or equal to the third difference, directly reducing the gain factor of the E-DPCCH to the second preset gain factor threshold; or if the second difference is less than the third difference, determining the transmit power of the DPCCH, dividing the second difference by the transmit power of the DPCCH to obtain a second ratio and reducing the gain factor of the E-DPCCH by the second ratio.

The second preset gain factor is predefined by the UE, or may be configured by the network for the UE.

The second preset gain factor threshold is predefined by the UE, or may be configured by the network and the second preset gain factor threshold may be a numerical value greater than 0, or may be 0.

Step 404: The UE determines its total uplink transmit power and if the total uplink transmit power of the UE exceeds the maximum allowed transmit power and the gain factor of the E-DPCCH is reduced to a second preset gain factor threshold, the UE reduces a gain factor of an HS-DPCCH.

In another embodiment of the present invention, step 404 may include the following steps (1) to (3).

(1) The UE determines its total uplink transmit power and if the total uplink transmit power of the UE exceeds the maximum allowed transmit power, the UE determines whether the gain factor of the E-DPCCH is reduced to the second preset gain factor threshold.

In another embodiment of the present invention, the total uplink transmit power of the UE is determined; the total uplink transmit power of the UE is compared with the maximum allowed transmit power; and if the total uplink transmit power of the UE exceeds the maximum allowed transmit power, the UE determines whether the gain factor of the E-DPCCH is reduced to the second preset gain factor threshold.

(2) If the gain factor of the E-DPCCH is reduced to the second preset gain factor threshold and a current timeslot of the UE is a timeslot used to transmit CQI information of the HS-DPCCH, the UE reduces the gain factor of the HS-DPCCH, so that total uplink transmit power of the UE does not exceed the maximum allowed transmit power, or the UE reduces transmit power of the HS-DPCCH to 0.

In another embodiment of the present invention, if the gain factor of the E-DPCCH is reduced to the second preset gain factor threshold and the current timeslot of the UE is a timeslot used to transmit CQI information of the HS-DPCCH, the gain factor of the HS-DPCCH is reduced by a third preset gain factor; total uplink transmit power of the UE is determined; and if the total uplink transmit power of the UE exceeds the maximum allowed transmit power, a gain factor of the HS-DPCCH is further reduced, so that total uplink transmit power of the UE does not exceed the maximum allowed transmit power, or the transmit power of the HS-DPCCH is reduced to 0.

Preferably, if the gain factor of the E-DPCCH is reduced to the second preset gain factor threshold and the current timeslot of the UE is a timeslot used to transmit CQI information of the HS-DPCCH, a fourth difference between the total uplink transmit power and the maximum allowed transmit power that are of the UE is calculated; the fourth difference is compared with the transmit power of the HS-DPCCH; and if the fourth difference is greater than or equal to the transmit power of the HS-DPCCH, the gain factor of the HS-DPCCH is directly reduced to 0; or if the fourth difference is less than the transmit power of the HS-DPCCH, the transmit power of the DPCCH is determined, dividing the fourth difference and by transmit power of the DPCCH to obtain a third ratio and the gain factor of the HS-DPCCH is reduced by the third ratio.

The third preset gain factor is predefined by the UE, or may be configured by the network for the UE.

(3) If the gain factor of the E-DPCCH is reduced to the second preset gain factor threshold and the current timeslot of the UE is a timeslot used to transmit ACK/NACK information of the HS-DPCCH, the UE reduces the gain factor of the HS-DPCCH, so that total uplink transmit power of the UE does not exceed the maximum allowed transmit power, or the UE reduces the gain factor of the HS-DPCCH to a third preset gain factor threshold.

In another embodiment of the present invention, if the gain factor of the E-DPCCH is reduced to the second preset gain factor threshold and the current timeslot of the UE is a timeslot used to transmit ACK/NACK information of the HS-DPCCH, the gain factor of the HS-DPCCH is reduced by a fourth preset gain factor; the UE determines its total uplink transmit power; and if the total uplink transmit power of the UE exceeds the maximum allowed transmit power, the UE further reduces a gain factor of the HS-DPCCH, so that total uplink transmit power of the UE does not exceed the maximum allowed transmit power, or the UE reduces a gain factor of the HS-DPCCH to the third preset gain factor threshold.

Preferably, if the gain factor of the E-DPCCH is reduced to the second preset gain factor threshold and the current timeslot of the UE is a timeslot used to transmit ACK/NACK information of the HS-DPCCH, a fifth difference between the total uplink transmit power and the maximum allowed transmit power that are of the UE is calculated and a sixth difference between the transmit power of the HS-DPCCH and a lowest power threshold of the HS-DPCCH is calculated; the fifth difference is compared with the sixth difference; and if the fifth difference is greater than or equal to the sixth difference, the gain factor of the HS-DPCCH is directly reduced to the third preset gain factor threshold; or if the fifth difference is less than the sixth difference, the UE determines the transmit power of the DPCCH, dividing the fifth difference by the transmit power of the DPCCH to obtain a fourth ratio and reduces the gain factor of the HS-DPCCH by the fourth ratio.

The fourth preset gain factor is predefined by the UE, or may be configured by the network for the UE.

The third preset gain factor threshold does not equal 0 and is greater than 0 and the third preset gain factor threshold may be predefined by the UE, or may be configured by the network.

The ACK/NACK information is a response of the UE to the network about whether downlink data sent by the network is received by the UE and therefore, transmit power of the HS-DPCCH channel on which the ACK/NACK information is sent is not reduced to 0 if possible.

When the total uplink transmit power of the UE exceeds the maximum allowed transmit power and the transmit power of the E-DPDCH is reduced to 0, the gain factor of the E-DPCCH may be preferably reduced and then the gain factor of the HS-DPCCH is reduced, or the gain factor of the HS-DPCCH may be preferably reduced and then the gain factor of the E-DPCCH is reduced. Order of reducing the gain factor of the E-DPCCH and reducing the gain factor of the HS-DPCCH is not limited in this application and in this embodiment, an example that the gain factor of the HS-DPCCH is reduced after the gain factor of the E-DPCCH is reduced is used for description.

Step 405: The UE determines its total uplink transmit power and if the total uplink transmit power of the UE exceeds the maximum allowed transmit power and the gain factor of the HS-DPCCH is reduced to a first preset gain factor threshold, the UE reduces a gain factor of a DPCCH and a gain factor of a DPDCH, so that total uplink transmit power of the UE does not exceed the maximum allowed transmit power.

In another embodiment of the present invention, step 405 may include the following steps (1) to (2).

(1) The UE determines its total uplink transmit power and if the total uplink transmit power of the UE exceeds the maximum allowed transmit power, the UE determines whether the gain factor of the HS-DPCCH is reduced to the first preset gain factor threshold.

In another embodiment of the present invention, the total uplink transmit power of the UE is determined; if the total uplink transmit power of the UE exceeds the maximum allowed transmit power and the current timeslot of the UE is a timeslot used to transmit ACK/NACK information of the HS-DPCCH, the UE determines whether the gain factor of the HS-DPCCH is reduced to the third preset gain factor threshold; or if the total uplink transmit power of the UE exceeds the maximum allowed transmit power and the current timeslot of the UE is a timeslot used to transmit CQI information of the HS-DPCCH, the UE determines whether the transmit power of the HS-DPCCH is reduced to 0.

The first preset gain factor threshold includes 0 and the third preset gain factor threshold.

(2) If the gain factor of the HS-DPCCH is reduced to the first preset gain factor threshold, the UE reduces the gain factor of the DPCCH and the gain factor of the DPDCH.

In another embodiment of the present invention, if the gain factor of the HS-DPCCH is reduced to the first preset gain factor threshold, the gain factor of the DPCCH and the gain factor of the DPDCH are reduced, where a ratio of a reduced gain factor of the DPDCH to a reduced gain factor of the DPCCH equals a first preset ratio.

The first preset ratio is a ratio of the gain factor of the DPDCH before reduction to the gain factor of the DPCCH before reduction and the first preset ratio is configured by the network for the UE.

Preferably, step 405 further includes: determining total uplink transmit power of the UE; and if the total uplink transmit power of the UE exceeds the maximum allowed transmit power and the gain factor of the HS-DPCCH is reduced to the first preset gain factor threshold, reducing the gain factor of the E-DPCCH, the gain factor of the HS-DPCCH, the gain factor of the DPCCH and the gain factor of the DPDCH, so that total uplink transmit power of the UE does not exceed the maximum allowed transmit power, a ratio of a reduced gain factor of the E-DPCCH to the reduced gain factor of the DPCCH equals a ratio of the gain factor of the E-DPCCH before reduction to the gain factor of the DPCCH before reduction, a ratio of a reduced gain factor of the HS-DPCCH to the reduced gain factor of the DPCCH equals a ratio of the gain factor of the HS-DPCCH before reduction to the gain factor of the DPCCH before reduction and the ratio of the reduced gain factor of the DPDCH to the reduced gain factor of the DPCCH equals the first preset ratio.

When ACK/NACK information is transmitted by an HS-PDCCH in a current timeslot and the transmit power of the E-DPCCH is not reduced to 0, the foregoing preferable step is executed.

When the total uplink transmit power of the UE is reduced according to the foregoing step 401 to step 405, so that total uplink transmit power of the UE does not exceed the maximum allowed transmit power, the UE sends HSDPA data to the network.

Further, a method that the network determines, according to an instruction of the UE, whether to send HSDPA data to the UE includes the following steps.

Step 406: In a first preset quantity of successive timeslots after a current timeslot, count a first quantity of times that the network receives the preset HARQ information.

Step 407: If the first quantity of times is greater than or equal to a second preset numerical value, determine that abnormality occurs on a downlink of the UE and stop sending HSDPA data to the UE.

Optionally, a method that the network stops sending HSDPA data to the UE according to the preset HARQ information sent by the UE includes: in a third preset quantity of successive timeslots after the current timeslot, calculating a second quantity of times that the network successively receives the preset HARQ information and if the second quantity of times is greater than a third preset numerical value, determining that abnormality occurs on the downlink of the UE and stopping sending HSDPA data to the UE.

Further, when the total uplink transmit power of the UE does not exceed the maximum allowed transmit power, the UE sends a normal piece of HARQ information to the network; the network determines, according to the received normal HARQ information, whether to send HSDPA data to the UE; the network may count a third quantity of times that the HARQ information is received; and if the third quantity of times is greater than or equal to the second preset numerical value, it is determined that the downlink of the UE is normal, so that the network sends HSDPA data to the UE.

Optionally, a method that the network resumes sending HSDPA data to the UE according to the preset HARQ information sent by the UE includes: in the third preset quantity of successive timeslots after the current timeslot, counting, by the network, a fourth quantity of times that the normal the HARQ information is received successively and if the fourth quantity of times equals the third preset numerical value, determining that abnormality occurs on the downlink of the UE, so that the network sends HSDPA data to the UE.

In the embodiment of the present invention, when total uplink transmit power of a UE exceeds maximum allowed transmit power, the UE first reduces a gain factor of a first-type channel; and if transmit power of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

Figure 5:
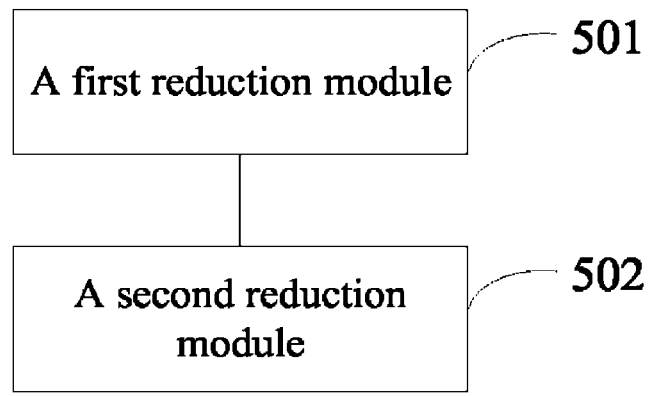
FIG. 5 is a schematic structural diagram of an apparatus for controlling transmit power of a user equipment according to an embodiment of the present invention.

An embodiment of the present invention provides an apparatus for controlling transmit power of a user equipment, where the apparatus for controlling transmit power of a user equipment may be a UE, or may be a part of a UE. Referring to FIG. 5, the apparatus for controlling transmit power of a user equipment includes: a first reduction unit 501, configured to reduce a gain factor of a first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel; and a second reduction module 502, configured to determine total uplink transmit power of the UE and if the total uplink transmit power of the UE exceeds the maximum allowed transmit power and the gain factor of the first-type channel is reduced to a preset gain factor threshold, reduce a gain factor of a second-type channel of the UE, so that total uplink transmit power of the UE does not exceed the maximum allowed transmit power, where the second-type channel includes a dedicated physical channel, where the dedicated physical channel includes a dedicated physical control channel and a dedicated physical data channel.

The first-type channel includes a high speed dedicated physical control channel (HS-DPCCH); and correspondingly, the first reduction module 501 includes: a first reduction unit, configured to: when the total uplink transmit power of the UE exceeds the maximum allowed transmit power, reduce a gain factor of the HS-DPCCH, so that total uplink transmit power of the UE does not exceed the maximum allowed transmit power, or reduce a gain factor of the HS-DPCCH to a first preset gain factor threshold.

Further, the first-type channel includes an enhanced dedicated physical data channel (E-DPDCH), an enhanced dedicated physical control channel (E-DPCCH) and a high speed dedicated physical control channel (HS-DPCCH); and correspondingly, the first reduction module 501 includes: a second reduction unit, configured to reduce a gain factor of the E-DPDCH when the total uplink transmit power of the UE exceeds the maximum allowed transmit power; and a third reduction unit, configured to determine total uplink transmit power of the UE and if the total uplink transmit power of the UE exceeds the maximum allowed transmit power and transmit power of the E-DPDCH is reduced to 0, reduce gain factors of the E-DPCCH and the HS-DPCCH.

The third reduction unit includes: a first reduction subunit, configured to preferably reduce a gain factor of the E-DPCCH; and a second reduction subunit, configured to determine total uplink transmit power of the UE and if the total uplink transmit power of the UE exceeds the maximum allowed transmit power and the gain factor of the E-DPCCH is reduced to a second preset gain factor threshold, reduce a gain factor of the HS-DPCCH.

The third reduction unit includes: a third reduction subunit, configured to preferably reduce the gain factor of the HS-DPCCH; and a fourth reduction subunit, configured to determine total uplink transmit power of the UE and if the total uplink transmit power of the UE exceeds the maximum allowed transmit power and the gain factor of the HS-DPCCH is reduced to a first preset gain factor threshold, reduce the gain factor of the E-DPCCH.

The third reduction unit includes a fifth reduction subunit, which is configured to: if a current timeslot of the UE is a timeslot used to transmit channel quality indicator CQI information of the HS-DPCCH, reduce the gain factor of the HS-DPCCH, so that total uplink transmit power of the UE does not exceed the maximum allowed transmit power, or reduce the gain factor of the HS-DPCCH to 0.

Further, the third reduction unit includes: a sixth reduction subunit, configured to: if the current timeslot of the UE is a timeslot used to transmit positive acknowledgement/negative acknowledgement (ACK/NACK) information of the HS-DPCCH, reduce the gain factor of the HS-DPCCH, so that total uplink transmit power of the UE does not exceed the maximum allowed transmit power, or reduce the gain factor of the HS-DPCCH to a third preset gain factor threshold.

The second-type channel includes a dedicated physical control channel (DPCCH) and a dedicated physical data channel (DPDCH); and correspondingly, the second reduction module 502 includes: a fourth reduction unit, configured to reduce a gain factor of the DPCCH and a gain factor of the DPDCH, so that total uplink transmit power of the UE does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

Optionally, the second reduction module 502 further includes: a fifth reduction unit, configured to reduce the gain factor of the first-type channel, where a ratio of a reduced gain factor of the first-type channel to the reduced gain factor of the DPCCH equals a ratio of the gain factor of the first-type channel before reduction to the gain factor of the DPCCH before reduction.

In the embodiment of the present invention, when total uplink transmit power of a UE exceeds maximum allowed transmit power, the UE first reduces a gain factor of a first-type channel; and if transmit power of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

Figure 6:
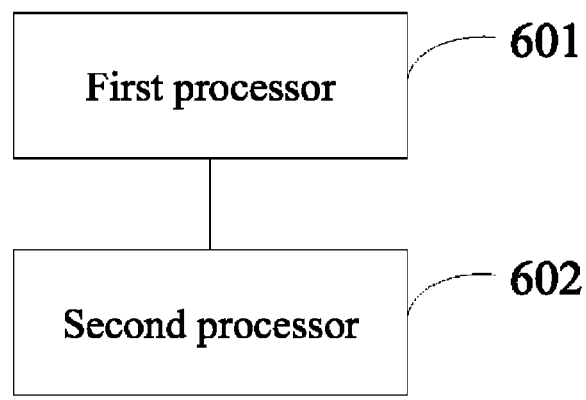
FIG. 6 is a schematic structural diagram of another apparatus for controlling transmit power of a user equipment according to an embodiment of the present invention.

An embodiment of the present invention provides an apparatus for controlling transmit power of a user equipment, where the apparatus for controlling transmit power of a user equipment may be a UE, or may be a part of a UE. Referring to FIG. 6, the apparatus for controlling transmit power of a user equipment includes: a processor 601, configured to reduce a gain factor of a first-type channel of the UE when total uplink transmit power of the user equipment (UE) exceeds maximum allowed transmit power, wherein the first-type channel includes a high speed packet access channel, where the high speed packet access channel includes a high speed packet access data channel and a high speed packet access control channel; and a second processor 602, configured to determine total uplink transmit power of the UE and if the total uplink transmit power of the UE exceeds the maximum allowed transmit power and the gain factor of the first-type channel is reduced to a preset gain factor threshold, reduce a gain factor of a second-type channel of the UE, so that total uplink transmit power of the UE does not exceed the maximum allowed transmit power, where the second-type channel includes a dedicated physical channel, where the dedicated physical channel includes a dedicated physical control channel and a dedicated physical data channel.

The first-type channel includes a high speed dedicated physical control channel (HS-DPCCH); and correspondingly, the first processor 601 is configured to: when the total uplink transmit power of the UE exceeds the maximum allowed transmit power, reduce a gain factor of the HS-DPCCH, so that total uplink transmit power of the UE does not exceed the maximum allowed transmit power, or reduce a gain factor of the HS-DPCCH to a first preset gain factor threshold.

Further, the first-type channel includes an enhanced dedicated physical data channel (E-DPDCH), an enhanced dedicated physical control channel (E-DPCCH) and a high speed dedicated physical control channel (HS-DPCCH); and correspondingly, the first processor 601 is configured to reduce a gain factor of the E-DPDCH when the total uplink transmit power of the UE exceeds the maximum allowed transmit power; and determine total uplink transmit power of the UE and if the total uplink transmit power of the UE exceeds the maximum allowed transmit power and transmit power of the E-DPDCH is reduced to 0, reduce gain factors of the E-DPCCH and the HS-DPCCH.

The first processor 601 is configured to reduce a gain factor of the E-DPCCH; and determine total uplink transmit power of the UE and if the total uplink transmit power of the UE exceeds the maximum allowed transmit power and the gain factor of the E-DPCCH is reduced to a second preset gain factor threshold, reduce a gain factor of the HS-DPCCH.

The first processor 601 is configured to reduce the gain factor of the HS-DPCCH; and determine a total uplink transmit power of the UE and if the total uplink transmit power of the UE exceeds the maximum allowed transmit power and the gain factor of the HS-DPCCH is reduced to a first preset gain factor threshold, reduce the gain factor of the E-DPCCH.

The first processor 601 is configured to: if a current timeslot of the UE is a timeslot used to transmit channel quality indicator CQI information of the HS-DPCCH, reduce the gain factor of the HS-DPCCH, so that total uplink transmit power of the UE does not exceed the maximum allowed transmit power, or reduce transmit power of the HS-DPCCH to 0; and if the current timeslot of the UE is a timeslot used to transmit positive acknowledgement/negative acknowledgement (ACK/NACK) information of the HS-DPCCH, reduce the gain factor of the HS-DPCCH, so that total uplink transmit power of the UE does not exceed the maximum allowed transmit power, or reduce the gain factor of the HS-DPCCH to a third preset gain factor threshold.

The second-type channel includes a dedicated physical control channel (DPCCH) and a dedicated physical data channel (DPDCH); and correspondingly, the second processor 602 is configured to reduce a gain factor of the DPCCH and a gain factor of the DPDCH, so that total uplink transmit power of the UE does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

Further, the second processor 602 is further configured to reduce the gain factor of the first-type channel, where a ratio of a reduced gain factor of the first-type channel to the reduced gain factor of the DPCCH equals a ratio of the gain factor of the first-type channel before reduction to the gain factor of the DPCCH before reduction.

In the embodiment of the present invention, when total uplink transmit power of a UE exceeds maximum allowed transmit power, the UE first reduces a gain factor of a first-type channel; and if transmit power of the first-type channel is reduced to a preset gain factor threshold but total uplink transmit power of the UE still exceeds the maximum allowed transmit power, a gain factor of a second-type channel of the UE is reduced, so that total uplink transmit power of the UE is less than or equal to the maximum allowed transmit power. The first-type channel is used to bear PS service data between the UE and a network and the second-type channel is used to bear CS service data between the UE and the network. The gain factor of the first-type channel is preferably reduced, that is, transmit power for PS services is reduced if possible, so as to ensure transmit power for CS services, thereby reducing a frequency of CS service call drop and ensuring continuity of calls between user equipments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely exemplary embodiments of the present invention, but are not intended to limit the present invention. Any modification, equivalent replacement and improvement made without departing from principle of the present invention shall fall within the protection scope of the present invention.

What is claimed is:

1. A method for controlling transmit power of a terminal, wherein the method comprises:
   reducing a gain factor of an enhanced dedicated channel (E-DCH) dedicated physical data channel (E-DPDCH) of the terminal when a first total uplink transmit power of the terminal exceeds a maximum allowed transmit power;
   reducing, if a transmit power of the E-DPDCH is reduced to 0, a gain factor of an enhanced dedicated physical control channel (E-DPCCH);
   determining a second total uplink transmit power of the terminal after reducing the gain factor of the DPCCH;
   reducing, if the second total uplink transmit power of the terminal exceeds the maximum allowed transmit power and the gain factor of the E-DPCCH is reduced to a second preset gain factor threshold, a gain factor of a high speed dedicated physical control channel (HS-DPCCH);
   determining a third total uplink transmit power of the terminal after reducing the gain factor of the HS-DPCCH; and
   reducing, if the third total uplink transmit power of the terminal exceeds the maximum allowed transmit power and the gain factor of the HS-DPCCH is reduced to a first preset gain factor threshold, a gain factor of a dedicated physical control channel (DPCCH) and a gain factor of a dedicated physical data channel (DP-DCH).

2. The method according to claim 1, wherein the reducing the gain factor of the HS-DPCCH comprises reducing, if a current timeslot of the terminal is a timeslot used to transmit channel quality indicator CQI information of the HS-DP-CCH, the gain factor of the HS-DPCCH, so that after reducing the gain factor of the HS-DPCCH, the third total uplink transmit power of the terminal does not exceed the maximum allowed transmit power.

3. The method according to claim 1, wherein the reducing the gain factor of the HS-DPCCH comprises reducing, if a current timeslot of the terminal is a timeslot used to transmit positive acknowledgement/negative acknowledgement (ACK/NACK) information of the HS-DPCCH, the gain factor of the HS-DPCCH, so that the third total uplink transmit power of the terminal, after reducing the gain factor of the HS-DPCCH, does not exceed the maximum allowed transmit power.

4. The method according to claim 1, wherein a total uplink transmit power of the terminal, after reducing the gain factor of the DPCCH and the gain factor of the DPDCH, does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

5. The method according to claim 4, wherein the first preset gain factor threshold is 0.

6. The method according to claim 1, wherein the method further comprises reducing, if the third total uplink transmit power of the terminal after reducing the gain factor of the HS-DPCCH exceeds the maximum allowed transmit power and the gain factor of the HS-DPCCH is reduced to the first preset gain factor threshold, the gain factor of the E-DPCCH again, the gain factor of the HS-DPCCH again, when reducing the gain factor of the DPCCH and the gain factor of the DPDCH so that a total uplink transmit power of the terminal does not exceed the maximum allowed transmit power, a ratio of a reduced gain factor of the E-DPCCH to a reduced gain factor of the DPCCH equals a ratio of the gain factor of the E-DPCCH before reduction to the gain factor of the DPCCH before reduction, a ratio of a reduced gain factor of the HS-DPCCH to a reduced gain factor of the DPCCH equals a ratio of the gain factor of the HS-DPCCH before reduction to the gain factor of the DPCCH before reduction and a ratio of a reduced gain factor of the DPDCH to a reduced gain factor of the DPCCH equals a ratio of the gain factor of the DPDCH before reduction to the gain factor of the DPCCH before reduction.

7. The method according to claim 1, wherein the second preset gain factor threshold is 0.

8. The method according to claim 1, wherein the method further comprises: reducing, if the third total uplink transmit power of the terminal after reducing the gain factor of the HS-DPCCH exceeds the maximum allowed transmit power and the gain factor of the HS-DPCCH is reduced to the first preset gain factor threshold, the gain factor of the HS-DPCCH again, when reducing the gain factor of the DPCCH and the gain factor of the DPDCH, so that a total uplink transmit power of the terminal does not exceed the maximum allowed transmit power, a ratio of a reduced gain factor of the HS-DPCCH to a reduced gain factor of the DPCCH equals a ratio of the gain factor of the HS-DPCCH before reduction to the gain factor of the DPCCH before reduction and a ratio of a reduced gain factor of the DPDCH to a reduced gain factor of the DPCCH equals a ratio of the gain factor of the DPDCH before reduction to the gain factor of the DPCCH before reduction.

9. The method according to claim 1, wherein the reducing the gain factor of the HS-DPCCH comprises reducing, if a current timeslot of the terminal is a timeslot used to transmit channel quality indicator CQI information of the HS-DP-CCH, the gain factor of the HS-DPCCH to 0.

10. The method according to claim 1, wherein the reducing the gain factor of the HS-DPCCH comprises reducing, if a current timeslot of the terminal is a timeslot used to transmit positive acknowledgement/negative acknowledgement (ACK/NACK) information of the HS-DPCCH, the gain factor of the HS-DPCCH, the gain factor of the HS-DPCCH to a third preset gain factor threshold.

11. An apparatus for controlling transmit power of a terminal, wherein the apparatus comprises:
   a first processor, configured to reduce a gain factor of an enhanced dedicated channel (E-DCH) dedicated physical data channel (E-DPDCH) of the terminal when a first total uplink transmit power of the terminal exceeds a maximum allowed transmit power; and
   a second processor, configured to reduce, if a transmit power of the E-DPDCH is reduced to 0, a gain factor of an enhanced dedicated physical control channel (E-DPCCH), determine a second total uplink transmit power of the terminal after reducing the gain factor of the E-DPCCH reduce, if the second total uplink transmit power of the terminal exceeds the maximum allowed transmit power and the gain factor of the E-DPCCH is reduced to a second preset gain factor threshold, a gain factor of a high speed dedicated physical control channel (HS-DPCCH), determine a third total uplink transmit power of the terminal after reducing the gain factor of the HS-DPCCH, and reduce, if the third total uplink transmit power of the terminal exceeds the maximum allowed transmit power and the gain factor of the HS-DPCCH is reduced to a first preset gain factor threshold, a gain factor of a dedicated physical control channel (DPCCH) and a gain factor of a dedicated physical data channel (DPDCH).

12. The apparatus according to claim 11, wherein the second processor is further configured to reduce, if a current timeslot of the terminal is a timeslot used to transmit channel quality indicator CQI information of the HS-DPCCH, the gain factor of the HS-DPCCH, so that after reducing the gain factor of the HS-DPCCH, the third total uplink transmit power of the terminal does not exceed the maximum allowed transmit power.

13. The apparatus according to claim 11, wherein the second processor is further configured to reduce, if a current timeslot of the terminal is a timeslot used to transmit positive acknowledgement/negative acknowledgement (ACK/NACK) information of the HS-DPCCH, the gain factor of the HS-DPCCH, so that the third total uplink transmit power of the terminal, after reducing the gain factor of the HS-DPCCH, does not exceed the maximum allowed transmit power.

14. The apparatus according to claim 11, wherein a total uplink transmit power of the terminal, after reducing the gain factor of the DPCCH and the gain factor of the DPDCH, does not exceed the maximum allowed transmit power and a ratio of a reduced gain factor of the DPDCH to a reduced gain factor of the DPCCH equals a ratio of the gain factor of the DPDCH before reduction to the gain factor of the DPCCH before reduction.

15. The apparatus according to claim 14, wherein the first preset gain factor threshold is 0.

16. The apparatus according to claim 11, wherein the second processor is further configured to reduce, if the third total uplink transmit power of the terminal after reducing the gain factor of the HS-DPCCH exceeds the maximum allowed transmit power and the gain factor of the HS-DPCCH is reduced to the first preset gain factor threshold, the gain factor of the E-DPCCH again, the gain factor of the HS-DPCCH again, when reducing the gain factor of the DPCCH and the gain factor of the DPDCH so that a total uplink transmit power of the terminal does not exceed the maximum allowed transmit power, a ratio of a reduced gain factor of the E-DPCCH to a reduced gain factor of the DPCCH equals a ratio of the gain factor of the E-DPCCH before reduction to the gain factor of the DPCCH before reduction, a ratio of a reduced gain factor of the HS-DPCCH to a reduced gain factor of the DPCCH equals a ratio of the gain factor of the HS-DPCCH before reduction to the gain factor of the DPCCH before reduction and a ratio of a reduced gain factor of the DPDCH to a reduced gain factor of the DPCCH equals a ratio of the gain factor of the DPDCH before reduction to the gain factor of the DPCCH before reduction.

17. The apparatus according to claim 11, wherein the second preset gain factor threshold is 0.

18. The apparatus according to claim 11, wherein, the second processor is further configured to reduce, if the third total uplink transmit power of the terminal after reducing the gain factor of the HS-DPCCH exceeds the maximum allowed transmit power and the gain factor of the HS-DPCCH is reduced to the first preset gain factor threshold, the gain factor of the HS-DPCCH again, when reducing the gain factor of the DPCCH and the gain factor of the DPDCH, so that a total uplink transmit power of the terminal does not exceed the maximum allowed transmit power, a ratio of a reduced gain factor of the HS-DPCCH to a reduced gain factor of the DPCCH equals a ratio of the gain factor of the HS-DPCCH before reduction to the gain factor of the DPCCH before reduction and a ratio of a reduced gain factor of the DPDCH to a reduced gain factor of the DPCCH equals a ratio of the gain factor of the DPDCH before reduction to the gain factor of the DPCCH before reduction.

19. The apparatus according to claim 11, wherein the second processor is further configured to reduce, if a current timeslot of the terminal is a timeslot used to transmit channel quality indicator CQI information of the HS-DPCCH, the gain factor of the HS-DPCCH to 0.

20. The apparatus according to claim 11, wherein the second processor is further configured to reduce, if a current timeslot of the terminal is a timeslot used to transmit positive acknowledgement/negative acknowledgement (ACK/NACK) information of the HS-DPCCH, the gain factor of the HS-DPCCH, the gain factor of the HS-DPCCH to a third preset gain factor threshold.

\* \* \* \* \*